(12) United States Patent
Biatov et al.

(10) Patent No.: US 9,646,605 B2
(45) Date of Patent: May 9, 2017

(54) FALSE ALARM REDUCTION IN SPEECH RECOGNITION SYSTEMS USING CONTEXTUAL INFORMATION

(71) Applicant: Interactive Intelligence, Inc., Indianapolis, IN (US)

(72) Inventors: Konstantin Biatov, Sankt Augustin (DE); Aravind Ganapathiraju, Hyderabad (IN); Felix Immanuel Wyss, Zionsville, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 274 days.

(21) Appl. No.: 13/746,687

(22) Filed: Jan. 22, 2013

(65) Prior Publication Data
US 2014/0207457 A1 Jul. 24, 2014

(51) Int. Cl.
| G10L 15/06 | (2013.01) |
| G06F 17/27 | (2006.01) |
| G10L 15/20 | (2006.01) |
| G10L 15/183 | (2013.01) |
| G10L 15/08 | (2006.01) |

(52) U.S. Cl.
CPC .......... G10L 15/063 (2013.01); G10L 15/183 (2013.01); *G10L 2015/088* (2013.01)

(58) Field of Classification Search
CPC .......... G10L 15/06; G10L 15/20; G06F 17/27
USPC .............................................. 704/243, 9, 233
See application file for complete search history.

(56) References Cited

U.S. PATENT DOCUMENTS

| 4,241,329 A | | 12/1980 | Bahler et al. | |
| 6,006,186 A | * | 12/1999 | Chen | G10L 15/142 704/249 |
| 6,076,056 A | * | 6/2000 | Huang | G10L 15/08 704/254 |
| 7,650,281 B1 | | 1/2010 | Cusmarin | |
| 7,877,258 B1 | * | 1/2011 | Chelba | G06F 17/2715 704/240 |
| 7,912,699 B1 | * | 3/2011 | Saraclar | G10L 15/142 704/231 |
| 8,433,576 B2 | * | 4/2013 | Li | G06F 17/271 704/251 |
| 8,457,959 B2 | * | 6/2013 | Kaiser | G09B 19/04 704/231 |

(Continued)

OTHER PUBLICATIONS

First Examination Report Issued by New Zealand Intellectual Property Office in related PCT/US2013/022495 (U.S. Appl. No. 13/746,687, mailed Feb. 10, 2016. New Zealand app No. 709320.

(Continued)

*Primary Examiner* — Pierre-Louis Desir
*Assistant Examiner* — Seong Ah A Shin

(57) ABSTRACT

A system and method are presented for using spoken word verification to reduce false alarms by exploiting global and local contexts on a lexical level, a phoneme level, and on an acoustical level. The reduction of false alarms may occur through a process that determines whether a word has been detected or if it is a false alarm. Training examples are used to generate models of internal and external contexts which are compared to test word examples. The word may be accepted or rejected based on comparison results. Comparison may be performed either at the end of the process or at multiple steps of the process to determine whether the word is rejected.

14 Claims, 8 Drawing Sheets

(56) References Cited

U.S. PATENT DOCUMENTS

| | | | | |
|---|---|---|---|---|
| 2002/0135618 | A1* | 9/2002 | Maes | G06F 3/0481 |
| | | | | 715/767 |
| 2003/0009333 | A1* | 1/2003 | Sharma | G10L 15/04 |
| | | | | 704/246 |
| 2003/0191625 | A1* | 10/2003 | Gorin | G06F 17/278 |
| | | | | 704/1 |
| 2006/0149558 | A1* | 7/2006 | Kahn | G10L 15/063 |
| | | | | 704/278 |
| 2007/0219793 | A1* | 9/2007 | Acero | G10L 15/197 |
| | | | | 704/240 |
| 2008/0071553 | A1* | 3/2008 | Hamadi | G06Q 10/00 |
| | | | | 705/1.1 |
| 2008/0104056 | A1* | 5/2008 | Li | G06F 17/30672 |
| 2008/0235016 | A1* | 9/2008 | Paul | G06N 99/005 |
| | | | | 704/246 |
| 2010/0070277 | A1* | 3/2010 | Arakawa | G10L 15/02 |
| | | | | 704/246 |
| 2010/0217596 | A1 | 8/2010 | Morris et al. | |
| 2011/0264443 | A1* | 10/2011 | Takamatsu | G06F 17/3061 |
| | | | | 704/9 |
| 2012/0232885 | A1* | 9/2012 | Barbosa | G06F 17/2715 |
| | | | | 704/9 |
| 2013/0006623 | A1* | 1/2013 | Chelba | G10L 15/187 |
| | | | | 704/233 |
| 2014/0359515 | A1* | 12/2014 | Medlock | G06F 3/0237 |
| | | | | 715/773 |

OTHER PUBLICATIONS

International Search Report and Written Opinion in PCT/US2013/022495 (U.S. Appl. No. 13/746,687) mailed Apr. 1, 2013.
Extended European Search Report in related foreign application PCT/US201302245, also filed as EP 13872885.2, issued Nov. 4, 2016.
Greve, De et al: "Keyword Spotting on Word Lattices", IDIAP Research Report, Sep. 1, 2007 (Sep. 1, 2007), XP055313184, Retrieved from the Internet: http:infoscience.epfl.ch/record/145965/files/degrave-idiap-rr-07-22.pdf [retrieved on Oct. 24, 2016].
A. Nadas: "Estimation of probabilities in the language model of the IBM speech recognition system", IEEE Transactions on Acoustics, Speech and Signal Processing, vol. 32, No. 4, Aug. 1, 1984, pgs. 859-861, XP055313379, USA.
Hain, Thomas, et al: "The Development of the AMI System for the Transcription of Speech in Meetings", Jan. 1, 2006, Machine Learning for Multimodal Interaction Lecture Notes in Computer Science;; LNCS, Springer, Berlin, DE, pp. 344-356, XP019028303.
Carlin, Michael A., Et al: "Rapid Evaluation of Speech Representations for Spoken Term Discovery", Twelfth Annual Conference of the International Speech Communication Association, Jan. 1, 2011, XP055313453, Retrieved from the Internet: http://www.clsp.jhu.edu/~samuel/pdfs/spoken_term.pdf [retrieved on Oct. 24, 2016].

\* cited by examiner

FALSE ALARM REDUCTION IN SPEECH RECOGNITION SYSTEMS USING CONTEXTUAL INFORMATION

BACKGROUND

The presently disclosed embodiments generally relate to telecommunications systems and methods, as well as automatic speech recognition systems. More particularly, the presently disclosed embodiments pertain to automatic speech recognition systems and the reduction of false alarms.

SUMMARY

A system and method are presented for using spoken word verification to reduce false alarms by exploiting global and local contexts on a lexical level, a phoneme level, and on an acoustical level. The reduction of false alarms may occur through a process that determines whether a word has been detected or if it is a false alarm. Training examples are used to generate models of internal and external contexts which are compared to test word examples. The word may be accepted or rejected based on comparison results. Comparison may be performed either at the end of the process or at multiple steps of the process to determine whether the word is rejected.

In one embodiment, a computer-implemented method of reducing false alarms in a speech recognition system is disclosed, comprising the steps of: a) analyzing a context of a set of words; b) obtaining contexts for said words; c) obtaining a set of training examples for said words; d) generating a set of models of the contexts; e) receiving a set of test words; f) comparing said set of test words with said set of models; g) obtaining a threshold for model comparison; h) determining if a result of comparing said set of test words with a first one of the set of models is within the threshold; and i) rejecting a word if the result is not within the threshold.

In another embodiment, a computer-implemented method of reducing false alarms in a speech recognition system is disclosed, comprising the steps of: a) analyzing a context of a set of words; b) obtaining contexts for said words; c) obtaining a set of training examples for said words; d) generating a set of models of the contexts; e) receiving a set of test words; f) comparing said set of test words with a first one of the set of models; g) obtaining a threshold for model comparison; h) determining if a result of comparing said set of test words with a first one of the set of models is within the threshold for said first model; i) rejecting a word if the result is not within the threshold; j) determining if a result of comparing said set of test words with a second one of the set of models is within a threshold for said second model; and k) rejecting a word if the result does not meet the second model threshold.

In another embodiment, a computer-implemented method of reducing false alarms in a speech recognition system is disclosed, comprising the steps of: a) receiving training examples; b) generating models of acoustical contexts of the training examples; c) generating models of phonetic contexts of the training examples; and d) generating models of linguistic contexts of the training examples.

In another embodiment, a system for reducing false alarms in a speech recognition system is disclosed, comprising: a) means for analyzing a context of a set of words; b) means for obtaining contexts for said words; c) means for obtaining a set of training examples for said words; d) means for generating a set of models of the contexts; e) means for receiving a set of test words; f) means for comparing said set of test words with said set of models; g) means for obtaining a threshold for model comparison; h) means for determining if a result of comparing said set of test words with a first one of the set of models is within the threshold; and i) means for rejecting a word if the result is not within the threshold.

DETAILED DESCRIPTION

Figure 1:
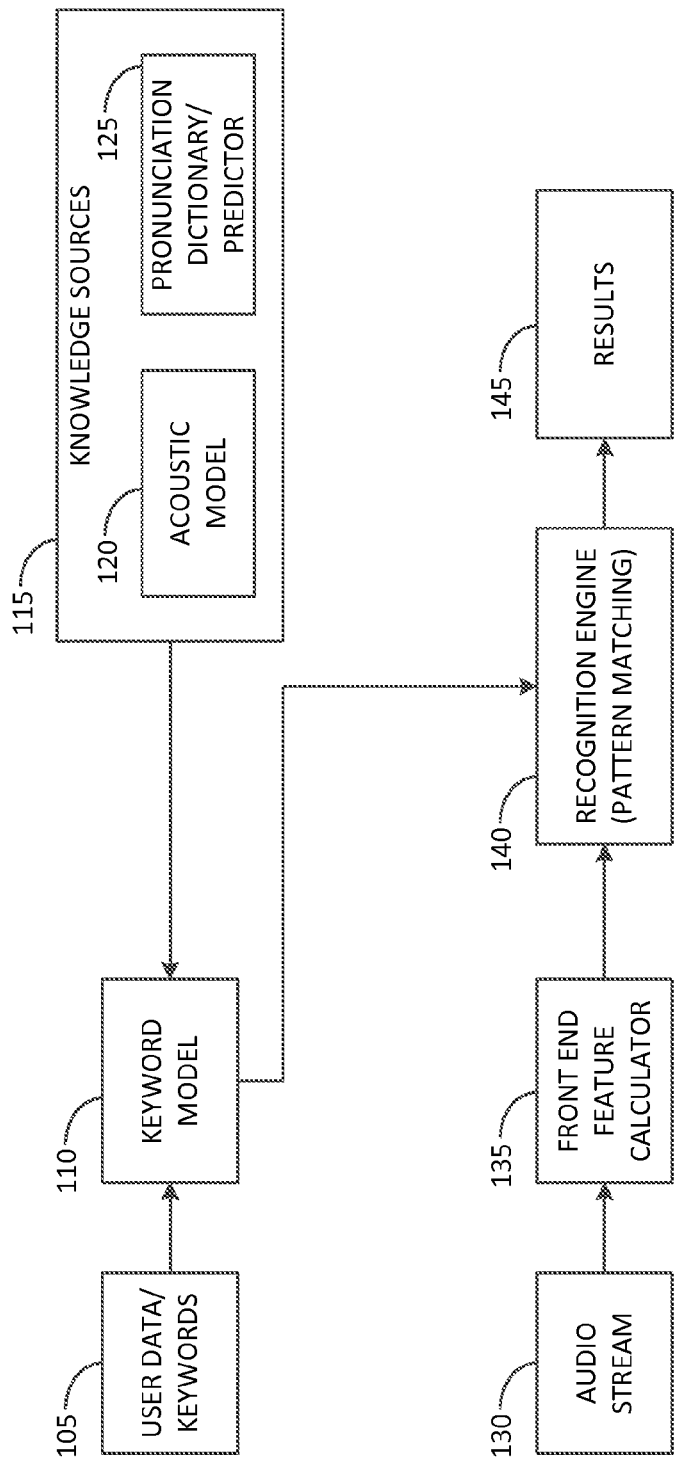
FIG. 1 is a diagram illustrating the basic components in one embodiment of a keyword spotter.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

False alarms or false positive decisions may occur in the detection and recognition of one or more spoken words in an audio signal. The occurrence may happen when detected spoken words are incorrectly determined to be identical to the user-defined word by the system. A detection error may occur if the detected word(s) associated with the false alarm may be acoustically similar to some part of a user-defined word. Detected words may also be acoustically similar to parts of multiple words, which may also result in a detection error. The usage of context, such as global context and local context, on multiple levels such as acoustical, phonetic, and lexical, for example, may avoid detection errors and reduce the false alarm rate within a system, such as that designed for keyword spotting for example.

A system and method are presented for using spoken word verification to reduce false alarms by exploiting contexts such as global and local, for example, on multiple levels such as lexical, phonetic, and acoustical. The described embodiments may be used in speech recognition systems such as, but not limited to, a grammar based speech recognition system or a keyword spotting system. The described embodiments may also be used for tuning generic speech-to-text engines. For example, in a keyword spotting system, the method may be applied after keywords are spotted to provide a verification that the keywords are spotted correctly. In at least one embodiment, a training phase is included in the method. Prior to the training phase, a keyword spotting system may be assumed to be working without keyword verification. Spotted keywords may be labeled as correctly or incorrectly spotted. The contexts of the recognized keywords may be selected automatically. The contexts of correctly recognized words may be labeled as the contexts of positive examples. Contexts of incorrectly recognized keywords may be labeled as the contexts of negative examples. During the training phase, a statistical model may be trained for each context. The model may compactly represent the features of each kind of the context.

At the acoustical level, the context extraction may be performed without a need for additional word or sub-word (e.g., phonemes, syllables) recognition. Acoustical contexts may refer to the sequences of the feature vectors extracted from the audio signal. The local acoustical internal context may refer to the acoustical context of the word neighboring the beginning and the end of a word contained within boundaries of the word. The local acoustical external context may refer to the acoustical context of the word neighboring the beginning and the end of a word lying outside the boundaries the word. The feature vector sequences that represent one type of the context for one word may be combined in one sequence. For each word context type such sequences may be collected. The model of corresponding context may be trained to represent this context compactly for each word. In at least one embodiment, a left internal, a right internal, a left external and a right external model is trained for each word.

In at least one embodiment, such as that in a keyword spotting system for example, keyword spotting is started and the verification method is exploited once the models of the contexts have been prepared. The keyword spotting system detects keywords, however, keywords may not be spotted correctly. The acoustical internal and external contexts of each recognized keyword may be automatically extracted and represented as a sequence of feature vectors. For each recognized keyword, the local internal and the local external contexts may be compared with the models of the local left internal contexts and the models of the local right internal contexts and with the models of the local left external contexts and the models of the right external contexts. It may then be determined whether or not the model comparisons are within a threshold to define true detection of the keywords or a false alarm. A threshold may be defined during the training phase either by a human or this threshold can be learned automatically using cross-validation sets.

In at least one embodiment, the threshold may be obtained in a supervised manner during the training phase. In obtaining a threshold, a user may exploit a validation set, define a set of thresholds, and sequentially apply spoken word verification to reduce false alarms using one of the thresholds. The threshold which provides maximum false alarm reduction with minimal incorrect rejections may then be selected for further processing. The threshold may be selected separately for each word, or a common threshold may be defined for all words.

In at least one embodiment, the threshold may be learned automatically using part of the validation set, or development set, that is not used for the model training. The predefined set of thresholds may be determined as a sequence of values, for example: 0.5, 0.6, 0.7, 0.8 . . . 2.2, 2.3 . . . 4.5. For an automatically definable threshold selection, the method of verification to reduce false alarms may be sequentially applied to each of the words from a development set. Each threshold may be exploited from the threshold set. In the development set, the words may be labeled as correctly detected or falsely detected. The local internal and the local external contexts of the words from the development set may be compared with the models of the local left and the local right internal contexts and with the models of the local left and the local right external contexts using one of the thresholds from a predefined threshold set. The true detection or false alarm is obtained for each threshold. This detection is automatically compared with the human labeling and the results of comparison are collected for further processing. The results may be, for example, a percent of words rejected as a false alarm or a percent of falsely rejected correct words. A result with the highest ratio of true rejected to false rejected words may be selected from the collected comparison results and the threshold corresponding to this result may be used as a predefined threshold for further processing. This threshold may be selected separately for each word or a common threshold may be defined for all words.

At the phonetic level, the context may refer to a predefined length sequence of phonemes obtained as a result of automatic phonemes recognition. The local phonetic internal contexts may refer to the predefined size phoneme sequences neighboring the beginning position and the end position of a word contained within boundaries of the word. The local phonetic external context may refer to the predefined size phoneme sequences neighboring the beginning and the end of a word lying outside the word boundaries. The phoneme sequences which represent one type of the context may be combined together. These sequences may be collected for each word context. For each word the context models may be trained to represent this context compactly. In at least one embodiment, a left internal, a right internal, a left external and a right external model for each word may be trained. At the phonetic level, the models may be represented as n-gram language models. In at least one embodiment, the perplexity measure may be used for the comparison of an unknown phoneme sequence with the language model. Other methods of measurement may be used.

A low perplexity of the unknown phoneme sequence with respect to the phoneme language model may indicate that the model fits this phoneme sequence well. The models of contexts may be represented as phoneme language models. The internal and external contexts of each new spotted word may be automatically extracted and represented as sequences of phonemes. Perplexity tests may be used as a test procedure to evaluate matches between statistical models of the word dependent left and right phonetic contexts and the left and right phonetic contexts of the test word. It may then be determined if the model comparisons are within a threshold to define true detection of the words or a true false alarm. In at least one embodiment, a person may define the threshold during the training phase. The threshold may also be learned automatically using cross-validation sets in a manner similar to that of the acoustic level, for example.

On the lexical level, the global context may refer to the words that co-occur in one sentence together with the words of interest. The left context may indicate that these words co-occur on the left side of the word of interest. The right context may indicate that these words co-occur on the right side of the word of interest. Such words may be obtained as a result of automatic word recognition of the original audio signal. In at least one embodiment, a global context may be analyzed by receiving trained positive and negative examples of spoken words with their left global lexical contexts and right global lexical contexts. The trained words may be labeled during supervised training by a human subject. Labels may reflect whether a trained word has been correctly detected or falsely detected, for example. Co-occurrence models may be generated of the left lexical contexts and the right lexical contexts of the spoken words. The context words sequences may comprise more than two of the non-stop words, which are not captured by the standard language model, on the left and on the right side of the word that co-occur with the word in one sentence. Stop-words may be defined as common, short function words, such as: the, is, at, which, and on. These words may carry little semantic information and are hard to detect by speech recognition systems.

In order to model lexical context, statistical models may be utilized. Such models may be in the form of sparse vectors for the left global lexical contexts and the right global lexical contexts for positive and negative examples. The left and right lexical contexts of the new spoken words may then be compared with co-occurrence models of the left and right lexical contexts. In at least one embodiment, a reasonable distance metric, such as Cosine distance, may be used to evaluate matches between the true word global lexical contexts and the test word global lexical context. Cosine distance may include, but not be limited to, a measure of inner product, weighted distance, and a difference between word frequencies. It may then be determined if the model comparisons are within a threshold to define true detection of the words or a false alarm. In at least one embodiment, a person may define the threshold during the training phase. The threshold may also be learned automatically using cross-validation sets in a manner similar to that of the acoustic level as previously described, for example.

Context size selection may be based on average phoneme and syllable duration to obtain acoustically homogenous contexts when said contexts belong to the same word type for further precise model training. The homogenous context may be obtained by defining the size of the local external and the local internal contexts.

Several strategies may be employed to reduce false alarms using the techniques as described above. In the one-step strategy, each new word is passed through the method as described in FIG. 5 in further detail below. The contexts are tested against models, however it is at the end of the tests that it is determined whether or not a word is determined as accepted or rejected.

In the sequential strategy, each new word may be sequentially passed through the method as described in FIG. 6 in further detail below. The contexts are tested against models. After specific steps, a word may be determined as accepted or rejected. Accepted words are passed through to the next step while rejected words are discarded. Words that pass every step are accepted as truly detected.

A multi-level strategy may also be employed as described in FIGS. 7 and 8 in further detail below. In the multi-level strategy, each new word is passed through the test based on acoustic contexts. The accepted hypothesis is then passed through the test based on phonetic contexts. Finally an accepted hypothesis is passed through the tests based on global lexical contexts. This differs from the one-step strategy in that the decision about acceptance or rejection is not done after each contextual test and is delayed to the end after completion of all tests.

FIG. 1 is a diagram illustrating the basic components in one embodiment of a keyword spotter, indicated generally at 100. The basic components of a keyword spotter 100 may include: User Data/Keywords 105; Keyword Model 110; Knowledge Sources 115, which may include an Acoustic Model 120 and a Pronunciation Dictionary/Predictor 125; an Audio Stream 130; a Front End Feature Calculator 135; a Recognition Engine (Pattern Matching) 140; and results containing found keywords in real-time 145.

User Data/Keywords 105 may be defined by the user of the system according to user preference. The Keyword Model 110 may be formed by concatenating phoneme hidden Markov models (HMMs). The Keyword Model 110 may be composed based on the Keywords 105 that are defined by the user and the input to the Keyword Model 110 based on Knowledge Sources 115. Such knowledge sources may include an Acoustic Model 120 and a Pronunciation Dictionary/Predictor 125.

A phoneme may be assumed to be the basic unit of sound. A predefined set of such phonemes may be assumed to completely describe all sounds of a particular language. The Knowledge Sources 115 may store probabilistic models, for example, hidden Markov model-Gaussian mixture model (HMM-GMM), of relations between pronunciations (phonemes) and acoustic events, such as a sequence of feature vectors extracted from the speech signal. A hidden Markov model (HMM) may encode the relationship of the observed audio signal and the unobserved phonemes. A training process may then study the statistical properties of the feature vectors emitted by an HMM state corresponding to a given phoneme over a large collection of transcribed training data. An emission probability density for the feature vector in a given HMM state of a phoneme may be learned through the training process. This process may also be referred to as acoustic model training Training may also be performed for a triphone. An example of a triphone may be a tuple of three phonemes in the phonetic transcription sequence corresponding to a center phone. Several HMM states of triphones are tied together to share a common emission probability density function. Typically, the emission probability density function is modeled using a Guassian mixture model (GMM). A set of these GMMs and HMMs is termed as an acoustic model.

The Knowledge Sources 115 may be developed by analyzing large quantities of audio data. The Acoustic Model 120 and the Pronunciation Dictionary/Predictor 125 are made, for example, by examining a word such as "hello" and the phonemes that comprise the word. Every keyword in the system is represented by a statistical model of its constituent sub-word units called phonemes. The phonemes for "hello" as defined in a standard phoneme dictionary are: "hh", "eh", "l", and "ow". These are then converted to a sequence of triphones, for example, "sil-hh+eh", "hh-eh+l", "eh-l+ow", and "l-ow+sil", where "sil" is the silence phone. Finally, as previously described, the HMM states of all possible triphones may be mapped to the tied-states. Tied-states are the unique states for which acoustic model training may be performed. These models may be language dependent. In order to also provide multi-lingual support, multiple knowledge sources may be provided.

The Acoustic Model 120 may be formed by statistically modeling the various sounds that occur in a particular language. The Pronunciation Dictionary 125 may be responsible for decomposing a word into a sequence of phonemes. For example, words presented from the user may be in human readable form, such as grapheme/alphabets of a particular language. However, the pattern matching algorithm may rely on a sequence of phonemes which represent the pronunciation of the keyword. Once the sequence of phonemes is obtained, the corresponding statistical model for each of the phonemes in the acoustic model may be examined. A concatenation of these statistical models may be used to perform keyword spotting for the word of interest. For words that are not present in the dictionary, a predictor, which is based on linguistic rules, may be used to resolve the pronunciations.

The Audio Stream 130 may be fed into the Front End Feature Calculator 135, which may convert the audio stream into a representation of the audio stream, or a sequence of spectral features. The Audio Stream 130 may be comprised of the words spoken into the system by the user. Audio analysis may be performed by computation of spectral features, for example, Mel Frequency Cepstral Coefficients (MFCC) and/or its transforms.

The Keyword Model 110, which may be formed by concatenating phoneme hidden Markov models (HMMs), and the signal from the Audio Stream 130 may both then be fed into a Recognition Engine for pattern matching 140. For example, the task of the recognition engine may be to take a set of words, also referred to as a lexicon, and search through the presented audio stream using the probabilities from the acoustic model to determine the most likely sentence spoken in that audio signal. One example of a speech recognition engine may include, but not be limited to, a Keyword Spotting System. For example, in the multi-dimensional space constructed by the Feature Calculator 135, a spoken word may become a sequence of MFCC vectors forming a trajectory in the acoustic space. Keyword spotting may now simply become a problem of computing probability of generating the trajectory given the keyword model. This operation may be achieved by using the well-known principle of dynamic programming, specifically the Viterbi algorithm, which aligns the keyword model to the best segment of the audio signal, and results in a match score. If the match score is significant, the keyword spotting algorithm infers that the keyword was spoken and reports a keyword spotted event.

The resulting sequence of words 145 may then be reported in real-time. For example, the report may be presented as a start and end time of the keyword or a sentence in the audio stream with a confidence value that a word was found. The primary confidence value may be a function of how the keyword is spoken. For example, in the case of multiple pronunciations of a single word, the keyword "tomato" may be spoken as "tuh-mah-tow" and "tuh-may-tow". The primary confidence value may be lower when the word is spoken in a less common pronunciation or when the word is not well enunciated. The specific variant of the pronunciation that is part of a particular recognition is also displayed in the report.

Figure 2:
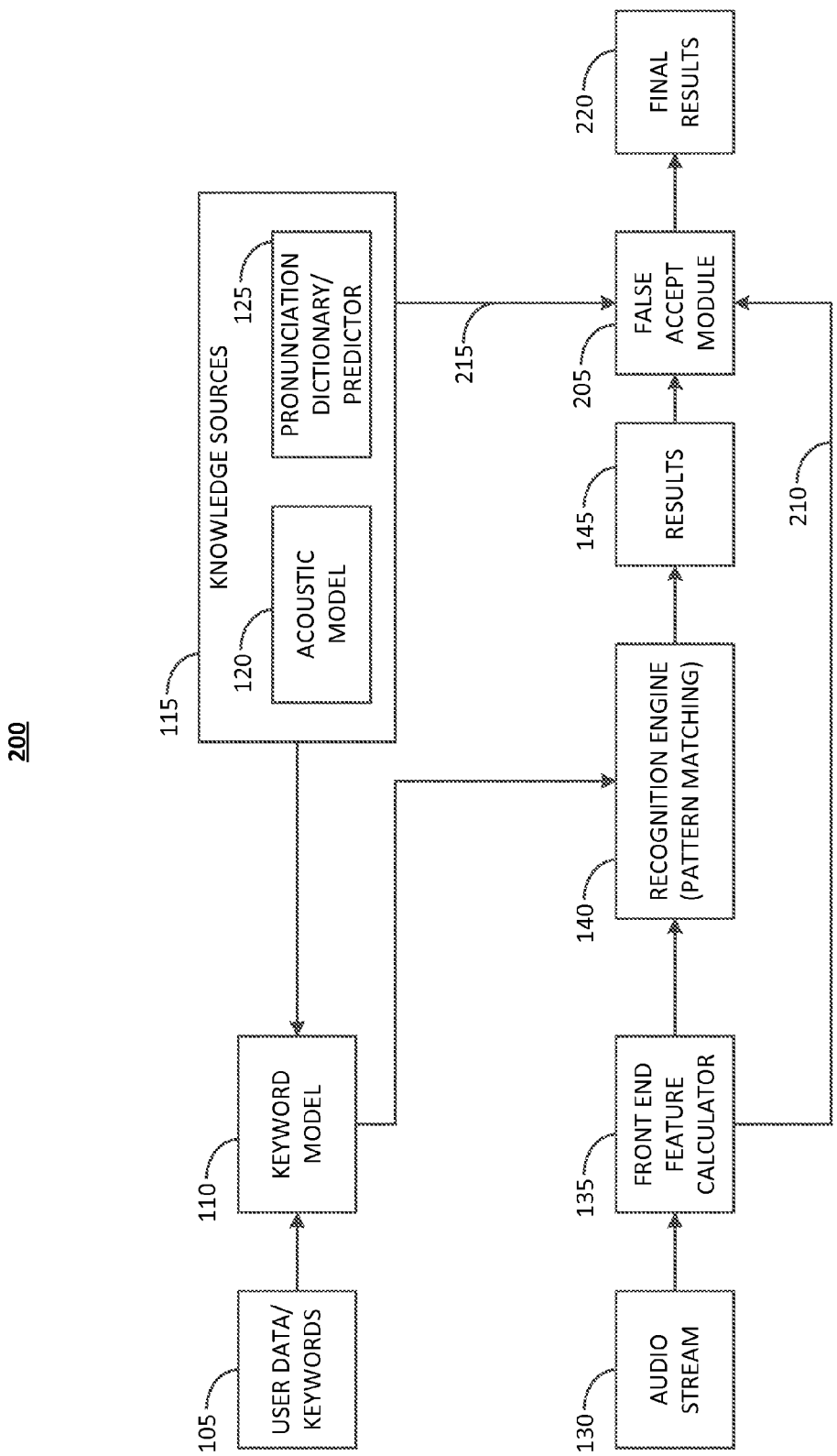
FIG. 2 is a diagram illustrating a modified embodiment of a keyword spotter.

FIG. 2 is a diagram illustrating one embodiment of a modified keyword spotter, indicated generally at 200. The basic components of a keyword spotter 100 may be included such as: User Data/Keywords 105; Keyword Model 110; Knowledge Sources 115, which may include an Acoustic Model 120 and a Pronunciation Dictionary/Predictor 125; an Audio Stream 130; a Front End Feature Calculator 135; a Recognition Engine (Pattern Matching) 140; and results containing found keywords in real-time 145 as previously described. In at least one embodiment, modifications may include a False Accept Module 205, Input 210 from the Front End Feature Calculator 135, Input 215 from the Knowledge Sources 115, and Final Results 220. The False Accept Module 205 may utilize the Input 215 from the available Knowledge Sources 115 and Input 210 from the Front End Feature Calculator 135 in order to improve false alarm rejection. This process is described in detail as follows. The Final Results 220 are then output from the False Accept Module 205.

Figure 3:
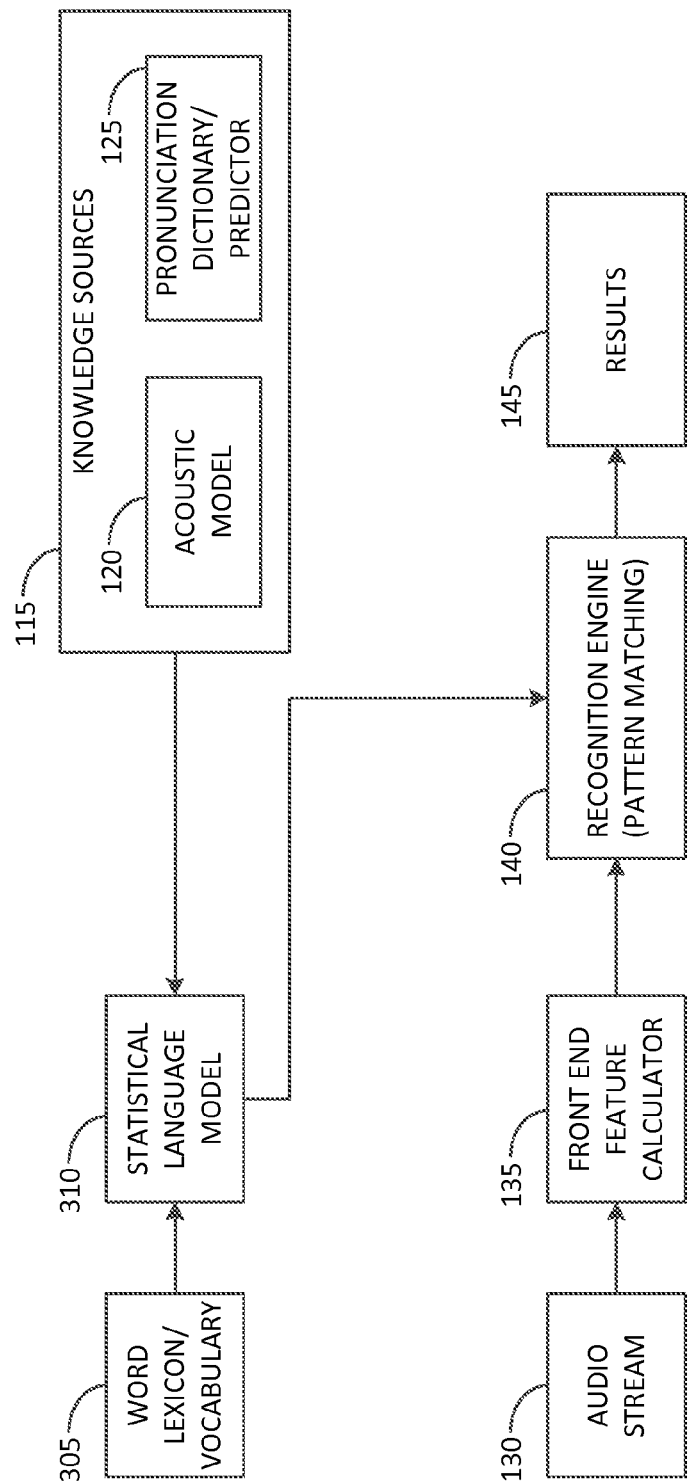
FIG. 3 is a diagram illustrating the basic components in one embodiment of a speech recognition system.

FIG. 3 is a diagram illustrating the basic components in one embodiment of a speech recognition system. The basic components of a speech recognition system may include elements of the system 100 such as: Knowledge Sources 115, which may include an Acoustic Model 120 and a Pronunciation Dictionary/Predictor 125; an Audio Stream 130; a Front End Feature Calculator 135; a Recognition Engine (Pattern Matching) 140; and results containing found words in real-time 145 as previously described. In at least one embodiment, the speech recognition system may include a Word Lexicon/Vocabulary 305 and a Statistical Language Model 310.

The Word Lexicon/Vocabulary 305 may comprise a set of words that the speech recognition engine is capable of recognizing. For a speech recognition engine such as a keyword spotter as previously described, the set of words may only number in the hundreds, for example. For large vocabulary speech recognition engines, this set may contain much higher numbers. Speech recognition systems may use the vocabulary or a lexicon to define the search space.

The Statistical Language Model 310 may be used in at least one embodiment for natural language processing applications. Such natural language processing applications may comprise speech recognition, machine translation, part-of-speech tagging, parsing, and information retrieval. A Statistical Language Model 310 may be used to capture properties of a language. The Statistical Language Model 310 may also be used to predict the next word in a speech sequence. In at least embodiment, a Statistical Language Model 310 may comprise a set of words, such as a set of keywords in a keyword spotter. In at least embodiment, a Statistical Language Model 310 may comprise a grammar which adds more structure to possible word sequences. In at least embodiment, a Statistical Language Model 310 may also comprise a more complex and powerful n-gram language model used in transcribing free-form conversational speech. An n-gram language model may comprise a statistical language model that aids in prediction of the next word given the past number of, or N, words in the sequence.

Figure 4:
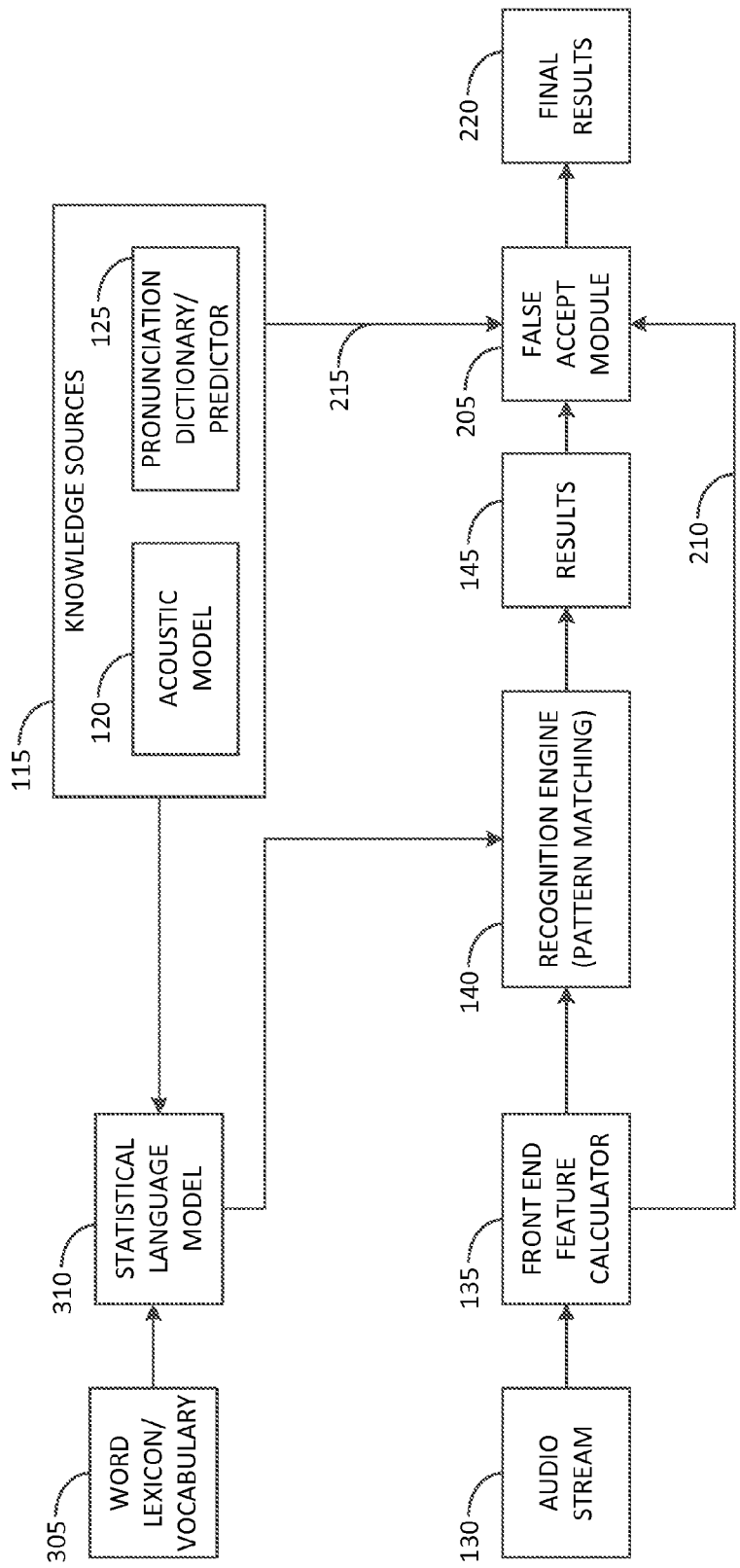
FIG. 4 is a diagram illustrating a modified embodiment of a speech recognition system.

FIG. 4 is a diagram illustrating one embodiment of a modified speech recognition system, indicated generally at 400. The basic components of a speech recognition system 300 may be included such as: a Word Lexicon/Vocabulary 305, a Statistical Language Model 310, Knowledge Sources 115, which may include an Acoustic Model 120 and a Pronunciation Dictionary/Predictor 125; an Audio Stream 130; a Front End Feature Calculator 135; a Recognition Engine (Pattern Matching) 140; and results containing found words in real-time 145 as previously described. In at least one embodiment, modifications may include a False Accept Module 205, Input 210 from the Front End Feature Calculator 135, Input 215 from the Knowledge Sources 115, and Final Results 220. The False Accept Module 205 may utilize the Input 215 from the available Knowledge Sources 115 and Input 210 from the Front End Feature Calculator 135 in order to improve false alarm rejection. This process is described in detail as follows. The Final Results 220 are then output from the False Accept Module 205.

Figure 5:
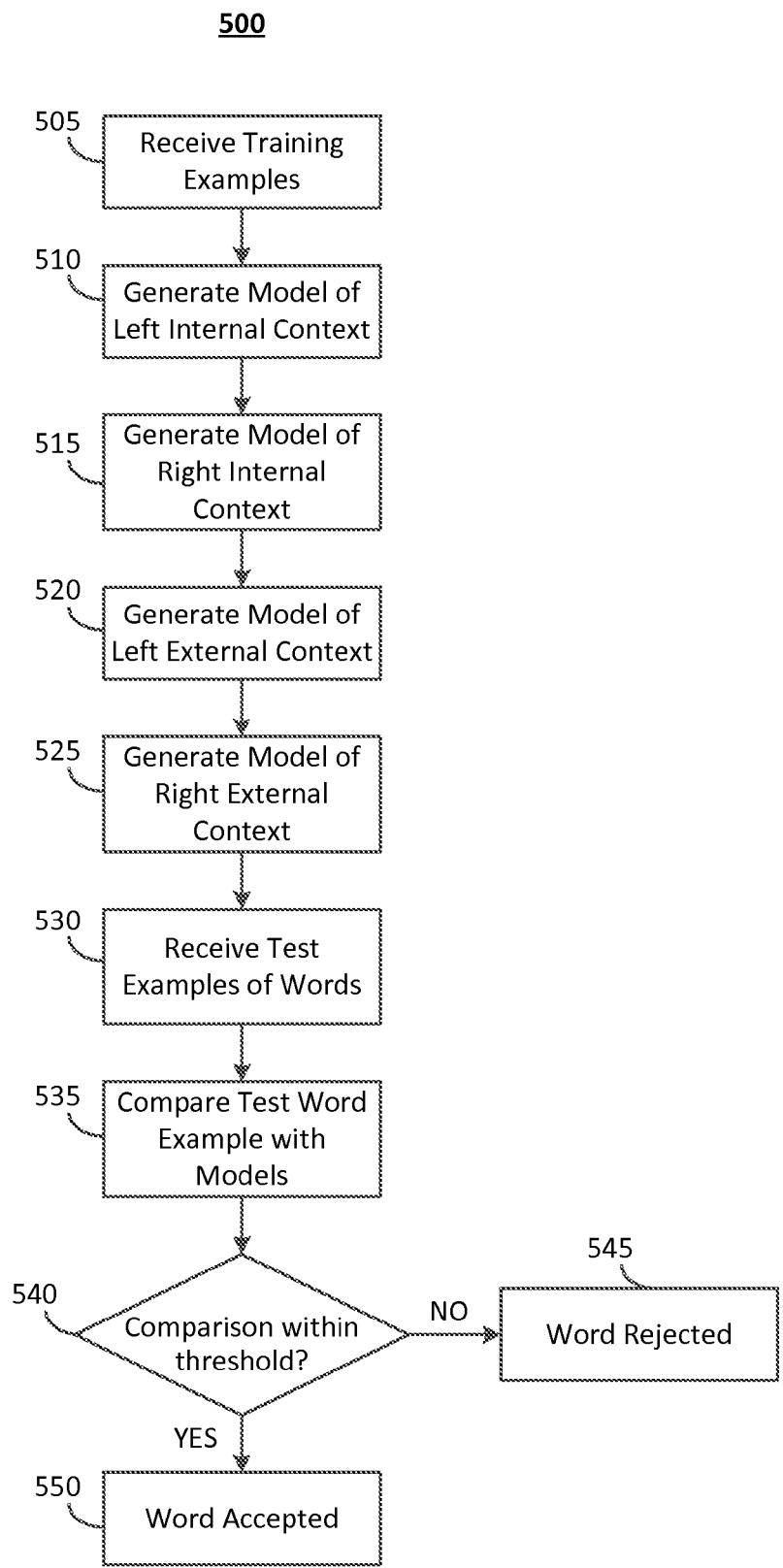
FIG. 5 is a flowchart illustrating one embodiment of a process for determining acceptance of a word.

As illustrated in FIG. 5 one embodiment of a process 500 for determining acceptance of a word is provided. The process 500 may be operative in the False Accept Module 205 of the systems 200 (FIG. 2) and 400 (FIG. 4).

In operation 505, training examples are received. For example, training examples for spoken words are received with their local contexts. The sizes of the local contexts, both internal and external, have predicted values which may be determined by examining the size of the context. In some embodiments, the size of the context is not less than the average phoneme duration and not more than the average syllable duration to ensure that the captured acoustics are homogenous for each type of context, e.g., left and right, for each word type. The spoken words with their external context may be received in digital or analog form. If the words are received in analog format, then digitizing of the analog format to the digital format is performed. Control is passed to operation 510 and process 500 continues.

In operation 510, a model of the left internal context is generated. For example, the model of the left internal context is generated for each word type using the training examples. For the left internal context, the beginning of the word may be used. In some embodiments, the size of the context is less than the average syllable size and more than the average phoneme size. This may be a user-defined value or an empirically chosen value. In at least one embodiment, the generation of the model may include compact representation of the left internal context in the form of acoustic features such as spectral, cepstral, or sinusoidal descriptions. One generative statistical model may then be trained that describes the behavior of the left internal context for all training examples of one word type. In at least one embodiment, the samples of the models of the word context may include Gaussian Mixture Models with full diagonal covariance, Hidden Markov Models, etc. Control is passed to operation 515 and process 500 continues.

In operation 515, a model of the right internal context is generated. For example, the model of the right internal context is generated for each word type using the training models. The right internal context may be ended at the end of the word. The size of the right internal context may have user-defined values and be defined in the same way as in operation 510. In at least one embodiment, the generation of the model may include compact representation of the left internal context in the form of spectral, cepstral, or sinusoidal descriptions. One generative statistical model may then be trained that describes the behavior of the right internal context for all training examples of one word type. Control is passed to operation 520 and process 500 continues.

In operation 520, a model of the left external context is generated. For example, the model of the local left external context is generated for each word type using the training examples. The left external context may be ended at the beginning of the word. The size of the left external context may have user-defined values and be defined in the same way as in operation 510. In at least one embodiment, the generation of the model may include compact representation of the left external context in the form of spectral, cepstral, or sinusoidal descriptions. One generative statistical model may then be trained that describes the behavior of the left external context for all training examples of one word type. Control is passed to operation 525 and process 500 continues.

In operation 525, a model of the right external context is generated. For example, the model of the local right external context is then generated for each word type using the training examples. The right external context may be started at the end of the word. The size of the right external context may have user-defined values and be defined in the same way as mentioned in operation 510. In at least one embodiment, the generation of the model may include compact representation of the right external context in the form of spectral, cepstral, or sinusoidal descriptions. One generative statistical model may then be trained that describes the behavior of the right external context for all training examples of one word type. Control is passed to operation 530 and process 500 continues.

In operation 530, test examples of the words are received. For example, the test example of words and their external contexts are received. In at least one embodiment, the position of a word in the voice file or in the audio stream may result from word spotting. After detection of the word, the verification procedure may be applied to verify whether the word has been falsely detected or correctly detected. The position of the detected word is defined by the beginning and the end of the word in the voice file or the audio stream. In at least one embodiment, for verification of the test word using external context, the beginning and the end of the word and the beginning of the left external context and the end of the right external context are required. The contexts should be received for the verification procedure. Control is passed to operation 535 and process 500 continues.

In operation 535, test word examples are compared with the models. For example, each test word example is compared with the models for the left internal context, the right internal context, the left external context, and the right external context simultaneously. For each word type, the statistical model describing the left internal context of those word types is trained. For left internal contexts of a new test word example, the probability is calculated that the left internal context of the new test word belongs to the model of the left internal context of this word type. For each word type, the statistical model describing the right internal context of those word types is trained. For right internal contexts of a new test word example, the probability is calculated that the right internal context of the new test word belongs to the model of the right internal context of this word type. For each word type, the statistical model describing the left external context of those word types is trained. For left external contexts of a new test word example, the probability is calculated that the left external context of the new test word belongs to the model of the left external context of this word type. For each word type, the statistical model describing the right external context of those word types is trained. For right external contexts of a new test word example, the probability is calculated that the right external context of the new test word belongs to the model of the right external context of this word type. Control is passed to operation 540 and process 500 continues.

In operation 540, it is determined whether or not the comparison of the test word examples with the models falls within a threshold. The threshold may be a user-defined threshold or an optimal automatically determined threshold. If it is determined that the comparison of the test word examples with the models falls within a threshold, then control is passed to step 550 and process 500 continues. If it is determined that the comparison of the test word examples with the models does not fall within a threshold, then control is passed to step 545 and process 500 continues.

The determination in operation 540 may be made based on any suitable criteria. For example, the probability is determined that the left internal context of the new test word belongs to the model of the left internal context of this word type. The probability is determined that the right internal context of the new test word belongs to the model of the right internal context of this word type. The probability is determined that the left external context of the new test word belongs to the model of the left external context of this word type. The probability is determined that the right external context of the new test word belongs to the model of the right external context of this word type. If the probabilities that the left and right internal contexts and the left and right external contexts of the tested word are within defined thresholds, then the tested word is accepted as detected. If the probabilities that the left and right internal contexts and the left and right external contexts of the tested word are not within defined thresholds, then the tested word is rejected as detected.

In operation 545, the word is rejected. The process 500 ends.

In operation 550, the word is accepted as detected. The process 500 ends.

Figure 6:
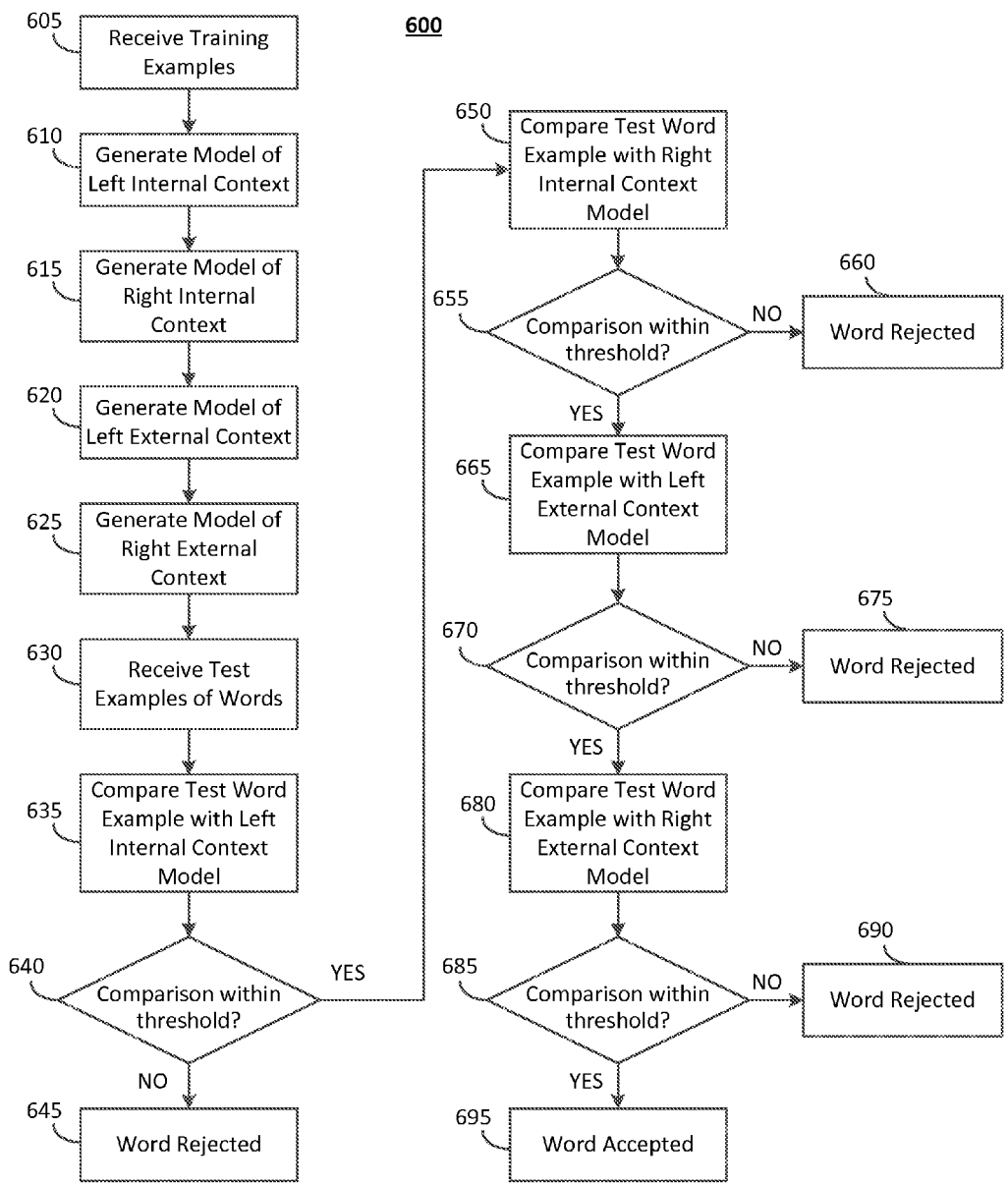
FIG. 6 is a flowchart illustrating one embodiment of a process for determining acceptance of a word.

As illustrated in FIG. 6, one embodiment of a process for determining acceptance of a word is provided, and indicated generally at 600. The process 600 may be operative in the False Accept Module 205 of the systems 200 (FIG. 2) and 400 (FIG. 4).

In operation 605, training examples are received. For example, training examples for spoken words are received with their local contexts. The sizes of the local contexts, both internal and external, have predicted values which may be determined by examining the size of the context. In some embodiments, the size of the context is not less than the average phoneme duration and not more than the average syllable duration to ensure that the captured acoustics are homogenous for each type of context, e.g., left and right, for each word type. The spoken words with their external context may be received in digital or analog form. If the words are received in analog format, then digitizing of the analog format to the digital format is performed. Control is passed to operation 610 and process 600 continues.

In operation 610, a model of the left internal context is generated. For example, the model of the left internal context is generated for each word type using the training examples. For the left internal context, the beginning of the word may be used. In some embodiments, the size of the context is less than the average syllable size and more than the average phoneme size. This may be a user-defined value or an empirically chosen value. In at least one embodiment, the generation of the model may include compact representation of the left internal context in the form of spectral, cepstral, or sinusoidal descriptions. One generative statistical model may then be trained that describes the behavior of the left internal context for all training examples of one word type. In at least one embodiment, the samples of the models of the word context may include Gaussian Mixture Models with full diagonal covariance, Hidden Markov Models, etc. Control is passed to operation 615 and process 600 continues.

In operation 615, a model of the right internal context is generated. For example, the model of the right internal context is generated for each word type using the training models. The right internal context may be ended at the end of the word. The size of the right internal context may have user-defined values and be defined in the same way as in operation 610. In at least one embodiment, the generation of the model may include compact representation of the right internal context in the form of spectral, cepstral, or sinusoidal descriptions. One generative statistical model may then be trained that describes the behavior of the right internal context for all training examples of one word type. Control is passed to operation 620 and process 600 continues.

In operation 620, a model of the left external context is generated. For example, the model of the local left external context is generated for each word type using the training examples. The left external context may be ended at the beginning of the word. The size of the left external context may have user-defined values and be defined in the same way as in operation 610. In at least one embodiment, the generation of the model may include compact representation of the left external context in the form of spectral, cepstral, or sinusoidal descriptions. One generative statistical model may then be trained that describes the behavior of the left external context for all training examples of one word type. Control is passed to operation 625 and process 600 continues.

In operation 625, a model of the right external context is generated. For example, the model of the local right external context is then generated for each word type using the training examples. The right external context may be started at the end of the word. The size of the right external context may have user-defined values and be defined in the same way as mentioned in operation 610. In at least one embodiment, the generation of the model may include compact representation of the right external context in the form of spectral, cepstral, or sinusoidal descriptions. One generative statistical model may then be trained that describes the behavior of the right external context for all training examples of one word type. Control is passed to operation 630 and process 600 continues.

In operation 630, test examples of the words are received. For example, the text example of words and their external contexts are received. In at least one embodiment, the position of a word in the voice file or in the audio stream may result from word spotting. After detection of the word, the verification procedure may be applied to verify whether the word has been falsely detected or correctly detected. The position of the detected word is defined by the beginning and the end of the word in the voice file or the audio stream. In at least one embodiment, for verification of the test word using external context, the beginning and the end of the word and the beginning of the left external context and the end of the right external context are required. The contexts should be received for the verification procedure. Control is passed to operation 635 and process 600 continues.

In operation 635, the test word examples are compared with the left internal context models. For example, each test word example is compared with the model of the left internal context. Control is passed to operation 640 and process 600 continues.

In operation 640, it is determined whether or not the comparison of the test word examples with the models falls within the threshold. If it is determined that the comparison of the test word examples with the models falls within the threshold, then control is passed to step 650 and process 600 continues. If it is determined that the comparison of the test word examples with the models does not fall within the threshold, then control is passed to step 645 and process 600 continues.

The determination in operation 640 may be made based on any suitable criteria. For example, if the result is within the threshold, then the word is further passed through the process to be examined with other types of context. If the result is not within the threshold, then the word is rejected as a false alarm at step 645. For the left internal context of a new test word example, the probability that the left internal context of the new test word belongs to the model of the left internal context of the word type is calculated. The calculated probability is then compared with the threshold to determine if the word probability is within the threshold-based restriction. If the probability of the word belonging to the model of left internal context is outside of the user defined threshold, the word will be considered as a false alarm and will be rejected from further evaluation. Otherwise, the word will be further evaluated in regards to the model of the right internal context.

In operation 645, the word is rejected. The process 600 ends.

In operation 650, the test word examples are compared with the right internal context models. For example, each test word example is compared with the model of the right internal context. Control is passed to operation 655 and process 600 continues.

In operation 655, it is determined whether or not the comparison of the test word examples with the models falls within a threshold. If it is determined that the comparison of the test word examples with the models falls within a threshold, then control is passed to step 665 and process 600 continues. If it is determined that the comparison of the test word examples with the models does not fall within the threshold, then control is passed to step 660 and process 600 continues.

The determination in operation 655 may be made based on any suitable criteria. For example, for the right internal context of a new test word example, the probability that the right internal context of the new test word belongs to the model of the right internal context of this word type is calculated. The calculated probability is then compared with the threshold to determine if the word probability is within the threshold-based restriction. If the probability of the word belonging to the model of right internal context is outside of the threshold, the word will be considered as a false alarm and will be rejected from further evaluation. Otherwise, the word will be further evaluated in regards to the model of the left external context.

In operation 660, the word is rejected. The process 600 ends.

In operation 665, the test word examples are compared with the left external context models. For example, each test word example is compared with the model of the local left external context. Control is passed to operation 670 and process 600 continues.

In operation 670, it is determined whether or not the comparison of the test word examples with the models falls within the threshold. If it is determined that the comparison of the test word examples with the models falls within the threshold, then control is passed to step 680 and process 600 continues. If it is determined that the comparison of the test word examples with the models does not fall within the threshold, then control is passed to step 675 and process 600 continues.

The determination in operation 670 may be made based on any suitable criteria. For example, for the left external context of a new test word example, the probability that the left external context of the new test word belongs to the model of the left external context of this word type is calculated. The calculated probability is then compared with the threshold to determine if the word probability is within the threshold-based restriction. If the probability of the word belonging to the model of left external context is outside of the threshold, the word will be considered as a false alarm and will be rejected from further evaluation. Otherwise, the word will be further evaluated in regards to the model of the right external context.

In operation 675, the word is rejected. The process 600 ends.

In operation 680, the test word examples are compared with the right external context models. For example, each test word right external context is compared with the model of the local right external context. Control is passed to operation 685 and process 600 continues.

In operation 685, it is determined whether or not the comparison of the test word examples with the models falls within the threshold. If it is determined that the comparison of the test word examples with the models falls within the threshold, then control is passed to step 695 and process 600 continues. If it is determined that the comparison of the test word examples with the models does not fall within the threshold, then control is passed to step 690 and process 600 continues.

The determination in operation 685 may be made based on any suitable criteria. For example, for the right external context of a new test word example, the probability that the right external context of the new test word belongs to the model of the right external context of this word type is calculated. The calculated probability is then compared with the threshold to determine if the word probability is within the threshold. If the probability of the word belonging to the model of right external context is outside of the threshold, the word will be considered as a false alarm and will be rejected from further evaluation. Otherwise, the word will be accepted as detected.

In operation 690, the word is rejected. The process 600 ends.

In operation 695, the word is accepted as detected. The process 600 ends.

Figure 7:
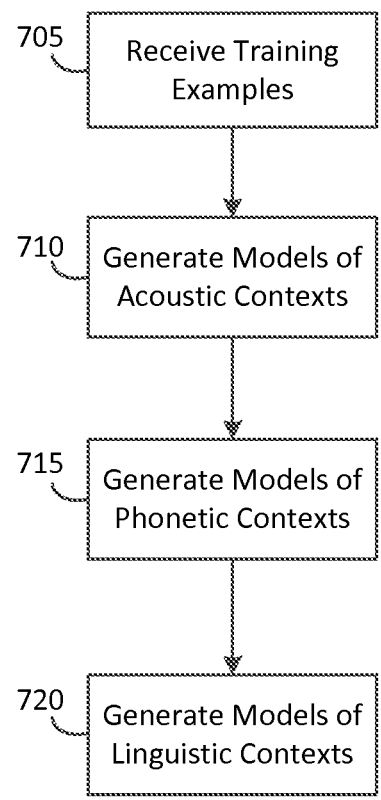
FIG. 7 is a flowchart illustrating one embodiment of a process for determining models.

As illustrated in FIG. 7, one embodiment of a process for generating models for use in a multi-level strategy (as further described in FIG. 8 below) is provided and indicated generally at 700. The process 700 may be operative in the false accept module 205 of the systems 200 (FIG. 2) and 400 (FIG. 4).

In operation 705, training examples are received. For example, training examples for spoken words are received with their local contexts. The sizes of the local contexts, both internal and external, may have predicted values which may be determined by examining the size of the context. In some embodiments, the size of the context is not less than the average phoneme duration and not more than the average syllable duration to ensure that the captured acoustics are homogenous for each type of context, e.g., left and right, for each word type. The spoken words with their external context may be received in digital or analog form. If the words are received in analog format, then digitizing of the analog format to the digital format is performed. Control is passed to operation 710 and process 700 continues.

In operation 710, models are generated of the acoustic contexts. At the acoustical level, the context may be performed without a need for additional word or sub-word (e.g., phonemes, syllables) recognition. Acoustical contexts may refer to the sequences of the feature vectors extracted from the audio signal. The local acoustical internal context may refer to the acoustical context of the word neighboring the beginning and the end of a word contained within boundaries of the word. The local acoustical external context may refer to the acoustical context of the word neighboring the beginning and the end of a word lying outside the boundaries the word. The feature vector sequences which represent one type of context for one word are combined in one sequence. For each word context type, such sequences are collected. The model of corresponding context may be trained to represent this context compactly for each word. In at least one embodiment, a left internal, a right internal, a left external and a right external model is trained for each word. Control is passed to operation 715 and process 700 continues.

In operation 715, models are generated of the phonetic contexts. At the phonetic level, the context may refer to a predefined length sequence of phonemes obtained as a result of automatic phonemes recognition. The local phonetic internal contexts may refer to the predefined size phoneme sequences neighboring the beginning position and the end position of a word contained within boundaries of the word. The local phonetic external context may refer to the predefined size phoneme sequences neighboring the beginning and the end of a word lying outside the word boundaries. The phoneme sequences which represent one type of the context may be combined together. These sequences may be collected for each word context. For each word the context models may be trained to represent this context compactly. In at least one embodiment, a left internal, a right internal, a left external and a right external model for each word may be trained. At the phonetic level, the models may be represented as n-gram language models. In at least one embodiment, the perplexity measure may be used for the comparison of an unknown phoneme sequence with the language model. Other methods of measurement may be used. Control is passed to operation 720 and process 700 continues.

In operation 720, models are generated of the linguistic contexts and the process ends. On the lexical level, the global context may refer to the words that co-occur in one sentence together with the words. The left context may indicate that these words co-occur on the left side of the word. The right context may indicate that these words co-occur on the right side of the word. Such words may be obtained as a result of automatic word recognition of the original audio signal. In at least one embodiment, a global context may be analyzed by receiving trained positive and negative examples of spoken words with their left global lexical contexts and right global lexical contexts. The trained words may be labeled during supervised training by a human subject. Labels may reflect whether a trained word has been correctly detected or falsely detected, for example. Co-occurrence models may be generated of the left lexical contexts and the right lexical contexts of the spoken words. The context words sequences may comprise more than two of the non-stop words, which are not captured by the standard language model, on the left and on the right side of the word that co-occur with the word in one sentence. Stop-words may be defined as common, short function words, such as: the, is, at, which, and on. These words may typically carry little semantic information and are hard to detect by speech recognition systems. In order to model lexical context, statistical models may be utilized. Such models may be in the form of sparse vectors for the left global lexical contexts and the right global lexical contexts for positive and negative examples.

Figure 8:
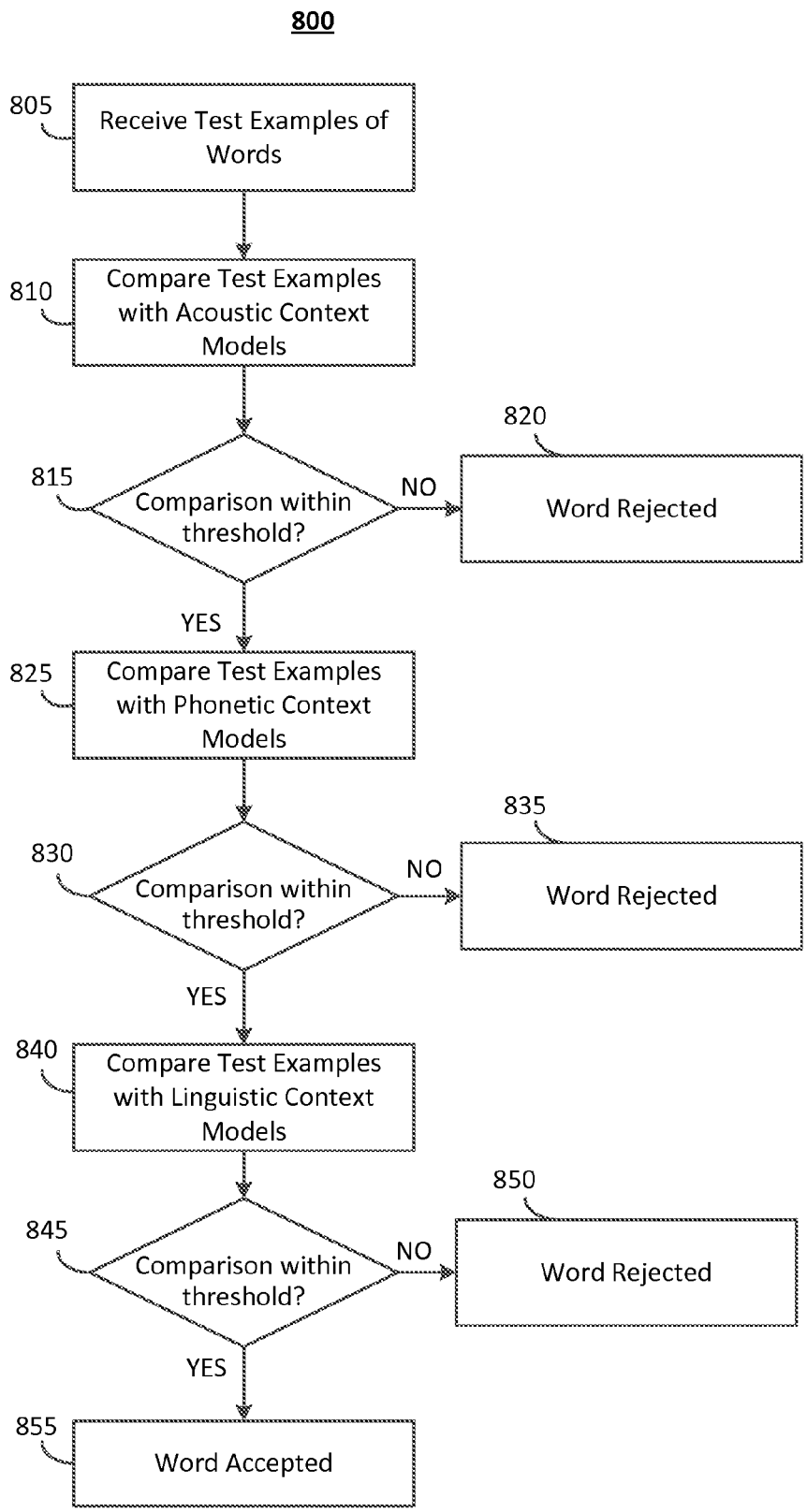
FIG. 8 is a flowchart illustrating one embodiment of a process for determining acceptance of a word.

As illustrated in FIG. 8, one embodiment of a process for determining acceptance of a word is provided and indicated generally at 800. The process 800 may be operative in the false accept module 205 of the systems 200 (FIG. 2) and 400 (FIG. 4). The multi-level strategy differs from the one-step strategy in that the decision about acceptance or rejection is not done after each contextual test and is delayed to the end after completion of all tests.

In operation 805, test examples of words are received. For example, the test example of words and their external contexts are received. The position of a word in the voice file or in the audio stream may result from word spotting. After detection of the word, the verification procedure may be applied to verify whether the word has been falsely detected or correctly detected. The position of the detected word is defined by the beginning and the end of the word in the voice file or the audio stream. In at least one embodiment, for verification of the test word using external context, the beginning and the end of the word and the beginning of the left external context and the end of the right external context are required. Control is passed to operation 810 and process 800 continues.

In operation 810, test examples of words are compared with acoustic context models. For example, each test word example is compared with the models for the left internal context, the right internal context, the left external context, and the right external context simultaneously. For each word type, the statistical model describing the left internal context of those word types is trained. For left internal contexts of a new test word example, the probability is calculated that the left internal context of the new test word belongs to the model of the left internal context of this word type. For each word type, the statistical model describing the right internal context of those word types is trained. For right internal contexts of a new test word example, the probability is calculated that the right internal context of the new test word belongs to the model of the right internal context of this word type. For each word type, the statistical model describing the left external context of those word types is trained. For left external contexts of a new test word example, the probability is calculated that the left external context of the new test word belongs to the model of the left external context of this word type. For each word type, the statistical model describing the right external context of those word types is trained. For right external contexts of a new test word example, the probability is calculated that the right external context of the new test word belongs to the model of the right external context of this word type. Control is passed to operation 815 and process 800 continues.

In operation 815, it is determined whether or not the comparison of the test word examples with the models falls within a threshold or an optimal automatically determined threshold. If it is determined that the comparison of the test word examples with the models falls within a threshold, then control is passed to step 825 and process 800 continues. If it is determined that the comparison of the test word examples with the models does not fall within a threshold, then control is passed to step 820 and process 800 continues.

The determination in operation 815 may be made based on any suitable criteria. For example, the probability is determined that the left internal context of the new test word belongs to the model of the left internal context of this word type. The probability is determined that the right internal context of the new test word belongs to the model of the right internal context of this word type. The probability is determined that the left external context of the new test word belongs to the model of the left external context of this word type. The probability is determined that the right external context of the new test word belongs to the model of the right external context of this word type. If the probabilities that the left and right internal contexts and the left and right external contexts of the tested words are within defined thresholds, then the tested word is accepted as detected. If the probabilities that the left and right internal contexts and the left and right external contexts of the tested words are not within defined thresholds, then the tested word is rejected as detected.

In operation 820, the word is rejected. The process 800 ends.

In operation 825, test examples of words are compared with phonetic context models. In at least one embodiment, the perplexity measure may be used for the comparison of an unknown phoneme sequence with the language model. Other methods of measurement may be used.

A low perplexity of the unknown phoneme sequence with respect to the phoneme language model may indicate that the model fits this phoneme sequence well. The models of contexts may be represented as phoneme language models. The internal and external contexts of each new spotted word may be automatically extracted and represented as sequences of phonemes. Perplexity tests may be used as a test procedure to evaluate matches between statistical models of the word dependent left and right phonetic contexts and the left and right phonetic contexts of the test word. It may then be determined if the model comparisons are within a threshold to defined true detection of the words or a true false alarm. In at least one embodiment, person may define the threshold during the training phase. The threshold may also be learned automatically using cross-validation sets in a manner similar to that of the acoustic level, for example. Control is passed to operation 830 and process 800 continues.

In operation 830, it is determined whether or not the comparison of the test word examples with the models falls within a threshold. The threshold may be a user-defined threshold or an optimal automatically determined threshold. If it is determined that the comparison of the test word examples with the models falls within a threshold, then control is passed to step 840 and process 800 continues. If it is determined that the comparison of the test word examples with the models does not fall within a threshold, then control is passed to step 835 and process 800 continues.

The determination in operation 830 may be made based on any suitable criteria. For example, the probability is determined that the left internal context of the new test word belongs to the model of the left internal context of this word type. The probability is determined that the right internal context of the new test word belongs to the model of the right internal context of this word type. The probability is determined that the left external context of the new test word belongs to the model of the left external context of this word type. The probability is determined that the right external context of the new test word belongs to the model of the right external context of this word type. If the probabilities that the left and right internal contexts and the left and right external contexts of the tested words are within defined thresholds, then the tested word is accepted as detected. If the probabilities that the left and right internal contexts and the left and right external contexts of the tested words are not within defined thresholds, then the tested word is rejected as detected.

In operation 835, the word is rejected. The process 800 ends.

In operation 840, test examples of words are compared with linguistic context models. The left and right lexical contexts of the new spoken words may then be compared with co-occurrence models of the left and right lexical contexts. In at least one embodiment, a reasonable distance metric, such as Cosine distance, may be used to evaluate matches between the true word global lexical contexts and the test word global lexical context. Cosine distance may include, but not be limited to, a measure of inner product, weighted distance, and a difference between word frequencies. It may then be determined if the model comparisons are within a threshold to define true detection of the words or a false alarm. In at least one embodiment, a person may define the threshold during the training phase. The threshold may also be learned automatically using cross-validation sets in a manner similar to that of the acoustic level as previously described, for example. Control is passed to operation 845 and process 800 continues.

In operation 845, it is determined whether or not the comparison of the test word examples with the models falls within a threshold. The threshold may be a user-defined threshold or an optimal automatically determined threshold. If it is determined that the comparison of the test word examples with the models falls within a threshold, then control is passed to step 855 and process 800 continues. If it is determined that the comparison of the test word examples with the models does not fall within a defined threshold, then control is passed to step 850 and process 800 continues.

The determination in operation 830 may be made based on any suitable criteria. For example, the probability is determined that the left internal context of the new test word belongs to the model of the left internal context of this word type. The probability is determined that the right internal context of the new test word belongs to the model of the right internal context of this word type. The probability is determined that the left external context of the new test word belongs to the model of the left external context of this word type. The probability is determined that the right external context of the new test word belongs to the model of the right external context of this word type. If the probabilities that the left and right internal contexts and the left and right external contexts of the tested words are within thresholds, then the tested word is accepted as detected. If the probabilities that the left and right internal contexts and the left and right external contexts of the tested words are not within the thresholds, then the tested word is rejected as detected.

In operation 850, the word is rejected. The process 800 ends.

In operation 855, the word is accepted. The process 800 ends.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A computerized method for reducing false alarms in a speech recognition system, the method comprising:
   receiving a plurality of training examples;
   generating a model of a left internal context based at least in part on the plurality of training examples, wherein the generation of the model includes compact representation of the left internal context in the form of spectral, cepstral or sinusoidal descriptions;
   generating a model of a right internal context based at least in part on the plurality of training examples, wherein the generation of the model includes compact representation of the right internal context in the form of spectral, cepstral or sinusoidal descriptions;
   generating a model of a left external context based at least in part on the plurality of training examples, wherein the generation of the model includes compact representation of the left external context in the form of spectral, cepstral or sinusoidal descriptions;
   generating a model of a right external context based at least in part on the plurality of training examples, wherein the generation of the model includes compact representation of the right external context in the form of spectral, cepstral or sinusoidal descriptions;
   receiving at least one test word, the at least one test word comprising an external context;

comparing the external context of the at least one test word against a threshold associated with each of the model of the left internal context, the model of the right internal context, the model of the left external context, and the model of the right external context; and rejecting the at least one test word if it is not within the thresholds.

2. The method of claim 1, wherein the test word is an analog context.

3. The method of claim 2, further comprising converting the test word from an analog context to a digital format.

4. The method of claim 1, further comprising:
learning an acceptable threshold for each of the model of the left internal context, the model of the right internal context, the model of the left external context, and the model of the right external context based at least in part on cross-validating sets; and wherein the comparing step is performed using each acceptable threshold.

5. The method of claim 1, wherein each training example in the plurality of training examples comprises a representation of a test word and a local context; and
wherein each local context is based on average phoneme and syllable duration from similar word types.

6. The method of claim 1, wherein the comparing step comprises the additional step of evaluating the at least one word with a perplexity test.

7. The method of claim 1, wherein each of the model of the left internal context, the model of the right internal context, the model of the left external context, and the model of the right external context include compact representations.

8. A computerized method for reducing false alarms in a speech recognition system, the method comprising:
receiving a plurality of training examples, each training example comprising a representation of a spoken word and a local context;
generating at least one model of an acoustic context based on the plurality of training examples, wherein the generation of the model includes compact representation of the acoustic context in the form of spectral, cepstral or sinusoidal descriptions;
generating at least one model of a phonetic context based on the plurality of training examples, wherein the generation of the model includes compact representation of the phonetic context in the form of spectral, cepstral or sinusoidal descriptions;
generating at least one model of a linguistic context based on the plurality of training examples, wherein the generation of the model includes compact representation of the linguistic context in the form of spectral, cepstral or sinusoidal descriptions;
receiving at least one test word, the at least one test word comprising an external context;
comparing the at least one test word against a threshold associated with each of the model of the acoustic context, the model of the phonetic context, and the model of the linguistic context; and
rejecting the at least one test word if it is not within the thresholds.

9. The method of claim 8, wherein the spoken word is an analog context.

10. The method of claim 9, further comprising converting the spoken word from an analog context to a digital format.

11. The method of claim 8, further comprising:
learning an acceptable threshold for each of the model of the acoustic context, the model of the phonetic context, and the model of the linguistic context based at least in part on cross-validating sets; and
wherein the comparing step is performed using each acceptable threshold.

12. The method of claim 8, wherein each training example in the plurality of training examples comprises a representation of a spoken word and a local context; and
wherein each local context is based on average phoneme and syllable duration from similar word types.

13. The method of claim 8, wherein the comparing step comprises the additional step of evaluating the at least one word with a perplexity test.

14. The method of claim 8, wherein the generating at least one model of an acoustic context step includes generating a left internal model, a right internal model, a left external model, and a right external model for each spoken word in the plurality of training examples.

* * * * *